United States Patent [19]

Sandstrom

[11] Patent Number: 5,095,492
[45] Date of Patent: Mar. 10, 1992

[54] SPECTRAL NARROWING TECHNIQUE

[75] Inventor: Richard L. Sandstrom, Encinitas, Calif.

[73] Assignee: Cymer Laser Technologies, San Diego, Calif.

[21] Appl. No.: 554,265

[22] Filed: Jul. 17, 1990

[51] Int. Cl.$^5$ .................................................. H01S 3/08
[52] U.S. Cl. ........................................ 372/102; 372/20; 372/33
[58] Field of Search ................. 372/102, 20, 33, 92, 372/98, 107, 108

[56] References Cited

U.S. PATENT DOCUMENTS

| | | | |
|---|---|---|---|
| 3,443,243 | 5/1969 | Datel | 372/102 |
| 4,696,012 | 9/1987 | Harshaw | 372/102 |
| 4,873,692 | 10/1989 | Johnson et al. | 372/102 |
| 4,951,285 | 8/1990 | Cole | 372/103 |

Primary Examiner—Léon Scott, Jr.
Attorney, Agent, or Firm—Ellsworth R. Roston; Charles H. Schwartz

[57] ABSTRACT

Monochromatic light from a laser gain generator passes through a first aperture to a beam expander which expands the beam width and reduces the angular divergence of the beam. The light from the beam expander has a curved wavefront because of (1) light diffraction in the aperture and (2) deviations from planar surfaces in the optical components in the light path. The light is then reflected by a first mirror to a grating which has a plurality of steps in a stepped configuration. The grating is adjustable curved so that the steps in the grating are parallel to the curved wavefront and so that light from only a particular band of wavelengths is reflected back to the first mirror. The light then passes back through the beam expander, which compresses the beam width, to the discharge chamber for further amplification. The light then passes through a second aperture to a partially reflecting mirror. A portion of the light is reflected by the partial mirror back to the discharge chamber for further amplification. The grating curvature is adjustable controlled by an apparatus which contacts the grating at three spaced points and which applies a controlled force to the grating along a line extending between one of the points and a position midway between the other two points. The grating curvature may be servoed to maintain the bandwidth of the laser light at a particular value as various components age.

29 Claims, 2 Drawing Sheets

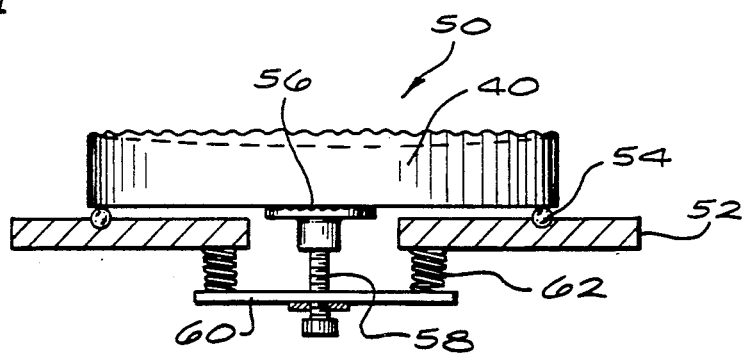
FIG. 4
FIG. 5
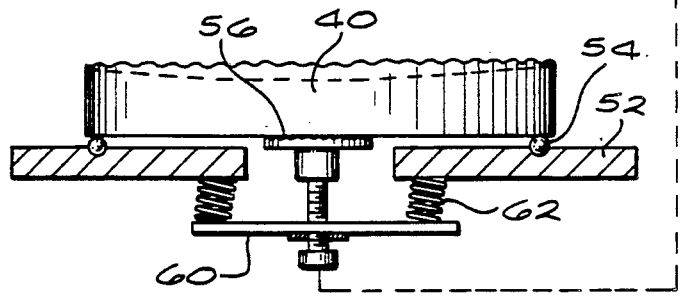
FIG. 6
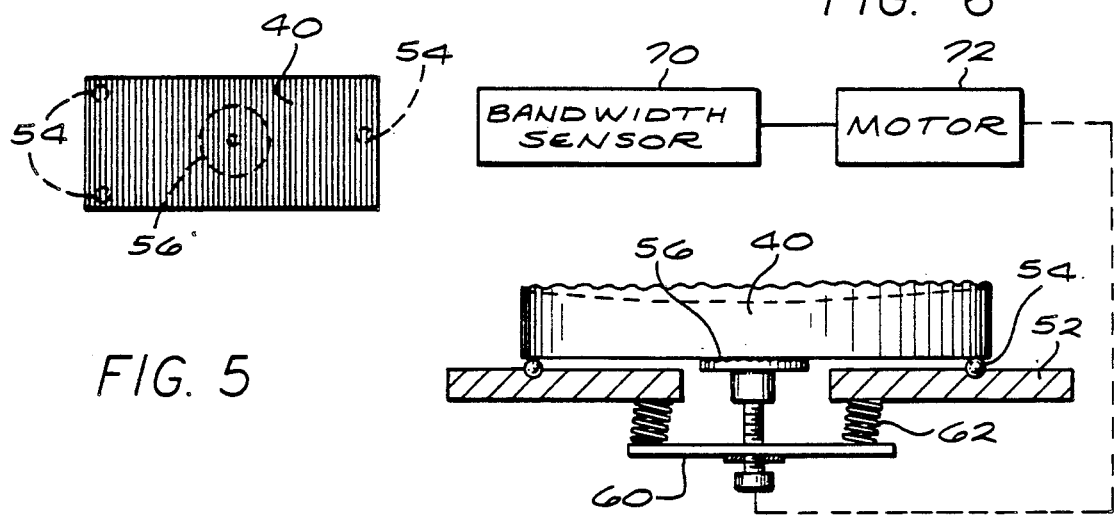
FIG. 7
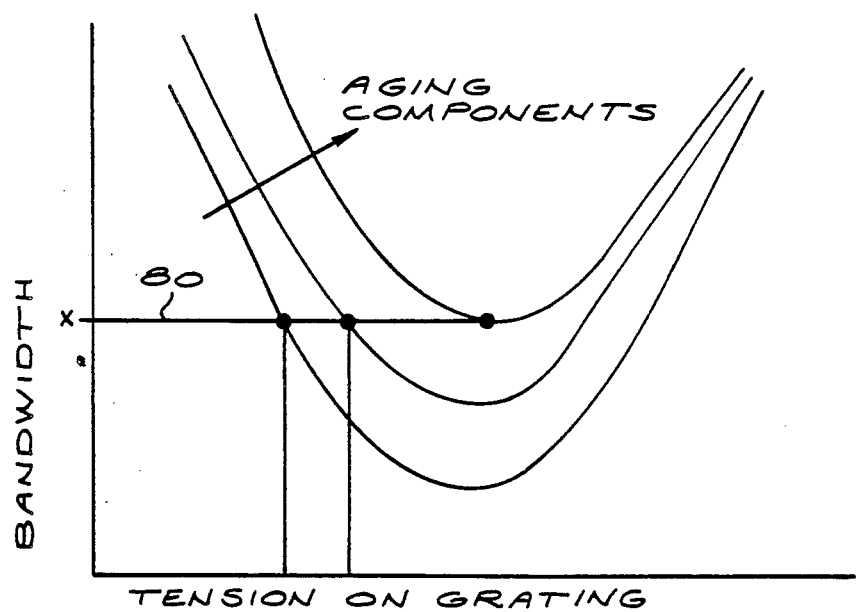

SPECTRAL NARROWING TECHNIQUE

This invention relates to a system for regulating the wavelengths of light as from a laser. More particularly, the invention relates to a system for regulating the light from a laser to provide light in a particular passband of wavelengths.

Integrated circuit chips are being produced in ever increasing volumes for use in all kinds of electrical equipment and digital computers and data processing systems. The integrated circuit chips are produced from dies which are disposed in a repetitive pattern on a wafer. Tens, and sometimes even hundreds, of such dies may be disposed on a wafer having a diameter as small as approximately five inches (5") and even less. In view of the considerable number of dies on a wafer, each wafer has to be processed precisely because an error in the processing of one die on a wafer may be repeated in the processing of other dies on the wafer. This precise processing is particularly important because the value represented by the different dies on a wafer may be in the thousands, and even ten of thousands, of dollars.

Each die on a wafer is formed from a plurality of layers. Each layer is formed in a precise pattern, generally quite complex. Some of these layers are formed from electrical material to represent electrical circuitry. Others of these layers are formed from dielectric material to provide electrical insulation between the electrically conductive layers. An error in the processing, or an imprecise processing, of any one of the layers on a die may result in a die which does not meet the specifications established for the die.

To form each layer on a die, a substantially uniform coating of a particular material may be deposited on a substrate formed from a base material such as silicon or on a material previously deposited on the substrate. For example, when the substantially uniform material is electrically conductive, it may be formed from a suitable material such as aluminum. The aluminum is then covered with a thin and substantially uniform layer of a masking material.

Light is then directed at the masking material through a mask. The mask is constructed to pass light in a spatial pattern corresponding to the spatial pattern desired for the material, such as the electrically conductive material, in the layer. The light passing to the layer hardens the masking material. An etching material such as an acid is then applied to the material, such as the electrically conductive material, in the layer. The etching material etches the material, such as the electrically conductive material, in the layer at the positions where the masking material has not been hardened. In this way, the material such as the electrically conductive material remains in the layer only at the positions where the masking material has been hardened. The hardened masking material is then washed from the layer to provide the desired pattern on this layer of the chip.

As will be seen, the light applied through the mask to the masking material such as the electrically conductive layer, on the layer has to be precisely controlled. This is particularly true since the dimensions of the electrical circuitry formed on each die have decreased with the passage of time. For example, a few years ago, the electrical leads formed in the electrical circuitry on dies had a width of approximately two (2) or three (3) microns. Now electrical circuitry is being formed on dies with thicknesses of approximately one micron ($1\mu$) and even eight tenths of a micron ($0.8\mu$). Plans are being formulated, and steps are being taken for implementation of such plans, to produce electrical circuitry on dies with electrical leads having a thickness of approximately four tenths of a micron ($0.4\mu$) and even one fourth of a micron ($0.25\mu$).

Lasers are used in many applications of producing precise patterns on the different layers of a die. Lasers are desirable because they produce substantially monochromatic light at high power levels. In recent times, the laser often used for such applications have been excimer lasers in the ultraviolet range. For example, excimer lasers with a wavelength of approximately two hundred and forty eight nanometers (248 nm) have been, and are being, employed to harden a layer of masking material in a particular pattern. These lasers are tunable over a relatively narrow range of wavelengths.

When lasers are employed to harden the masking material, it is desirable that the wavelength band of the light from the laser be relatively narrow. This results from the fact that changes in the narrow band of wavelengths from the laser adversely affect the focussing of the light at the surface of the masking layer. This adversely affects the sharpness of the pattern in which the masking material is hardened. It accordingly affects adversely the sharpness of the pattern of the electrical circuitry produced in the electrically conductive layer covered by the masking material. This in turn adversely affects the electrical characteristics of the electrical circuitry.

In the optical systems now in use with an excimer laser, a grating is used to force the laser to resonate at a particular wavelength within the spectral gain profile of the laser, and to narrow the range of wavelengths. The grating now in use is planar. However, the light passing to the grating generally has a curved wavefront because of the imperfections of optical components used in conjunction with the grating, and because of changes in the optical characteristics of these components as a result of component aging. The passage of the curved wavefront of light to the grating in the planar disposition of the grating prevents the grating from operating to obtain an optimum selectivity in the bandwidth of the light since different portions of the curved wavefront strike the planar grating at slightly different angles.

The problem discussed in the previous paragraph has existed for some time. A considerable effort has been made, and significant amounts of money have been expended, to resolve this problem. In spite of this, the problem still exists. Actually, the problem has become aggravated with the passage of time because the thickness of the electrical leads on the dies has been progressively decreased during such time.

This invention provides a technique for matching the curvature of the grating to the wavefront of the light striking it. In one embodiment of the invention, monochromatic light from a laser gain generator passes through a first aperture to a beam expander which expands the beam width and limits the angular divergence of the beam. The light from the beam expander has a curved wavefront because of (1) light diffraction in the aperture and (2) deviations from planar surfaces in the optical components in the light path. The light is then reflected by a first mirror to a grating which has a plurality of steps in a stepped configuration.

The grating is adjustably curved so that the steps in the grating are parallel to the curved wavefront and so that light from only a particular band of wavelengths is reflected back to the first mirror. The light from the first mirror then passes back through the beam expander, which compresses the beam width, to the discharge chamber for further amplification. The light then passes through a second aperture to a partially reflecting mirror. A portion of the light is reflected by the partial mirror back to the discharge chamber for further amplification.

The grating curvature is adjustably controlled by an apparatus which contacts the grating at three spaced points and which applies a controlled force to the grating along a line extending between one of the points and a position midway between the other two points. The grating curvature may be served to maintain the bandwidth of the laser light at a particular value as various components age.

In the drawings:

FIG. 4 is a schematic front elevational view of apparatus shown with the grating of FIGS. 1 and 2 for producing a curvature in the grating to obtain the grating of FIG. 3;

FIG. 5 is a schematic plan view of the apparatus shown in FIG. 4;

Figure 1:
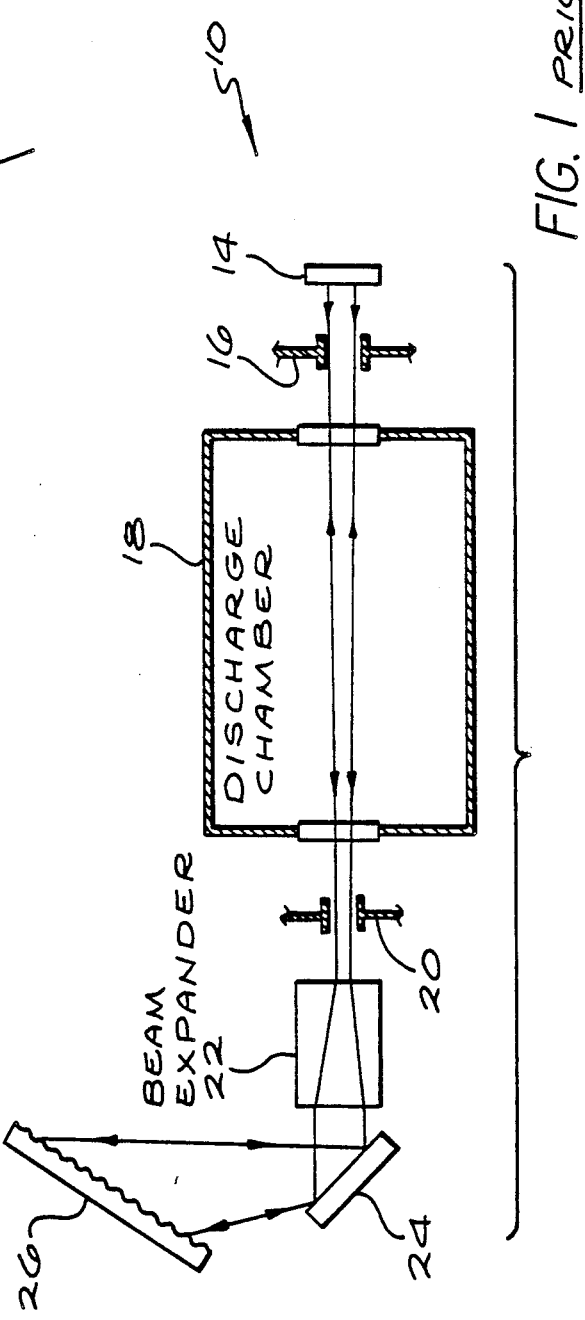
FIG. 1 is a schematic diagram of an optical system used in the prior art for providing monochromatic light in a particular passband of wavelengths.
Figure 3:
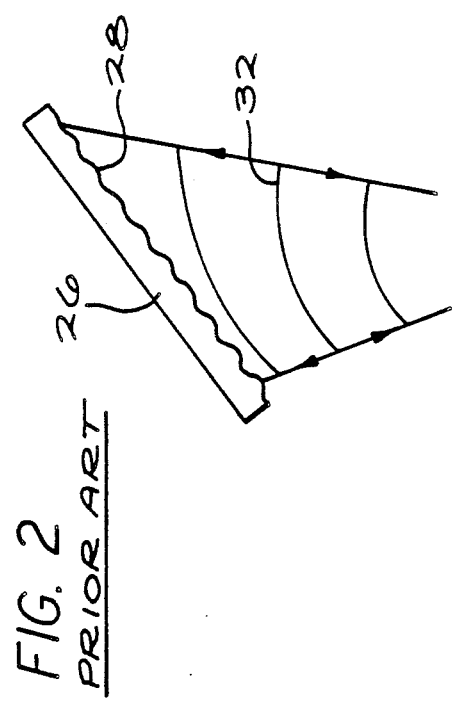
FIG. 3 is an enlarged fragmentary schematic diagram of a grating used in the optical system of this invention and of wavefronts of light passing to such grating.

FIG. 6 is a schematic diagram of a servo system used with the apparatus of FIG. 4 for regulating the curvature of the grating to obtain passage of light only in the particular passband of wavelengths as the components in the optical system shown in FIGS. 1 and 3 age; and FIG. 7 is a curve illustrating how the system shown in FIG. 6 maintains the passage of light only in the particular passband of wavelengths even as the components in the optical system shown in FIGS. 1 and 3 age.

FIG. 1 schematically illustrates an optical system, generally indicated at 10, of the prior art for producing monochromatic light in a particular band of wavelengths. The system of FIG. 1 forms a spectrally narrowed laser preferably, but not limited to, of the excimer type. Such a laser operates at a suitable wavelength in the ultraviolet range, for example at approximately two hundred and forty eight nanometers (248.000 nm). The excimer laser is typically pulsed at a suitable repetition rate such as approximately two hundred (200) pulses per second. Although the particular embodiment of this invention preferably uses a pulsed laser, a laser operating on a continuous basis is also quite satisfactory.

Ultraviolet light with an initially broad range of wavelength around 248 nm is generated by a discharge chamber 18 which may be constructed in a manner well known in the art. The discharge chamber 18 contains a mixture of neon, krypton, and fluorine which become energized by a fast transverse electrical discharge. This excitation forms the excimer molecule KrF with the necessary population inversion for laser operation.

The light then passes through an aperture 20 into a beam expander 22 which may be constructed in a conventional manner using lenses, prisms, etc. The beam expander 22 expands the width of the beam so that the beam will have at least a minimum width. The beam expander 22 also decreases any divergence of the light rays in the beam. The light passing through the beam expander 22 is reflected by a mirror 24 to a grating 26. The grating 26 is formed from a plurality of steps 28 (FIG. 2) in a stepped configuration. As will be seen, the grating 26 has a planar configuration.

Each of the steps 28 is shaped to reflect the light passing to such step from the mirror 24. Only the light in a particular band of wavelengths will be reflected exactly back on itself. Any light outside of this particular band will be reflected by the grating 26 through angles which will misalign the light with respect to the rest of the optional resonator. The light passing to the mirror 24 from the grating 26 will then pass through the beam expander 22 and the aperture 20 to the discharge chamber 18.

The light returning to the discharge chamber 18 is amplified and is passed through the aperture 16 to the mirror 14. The mirror 14 is constructed to pass approximately ninety percent (90%) of the light. The light then passes to a target such as a semiconductor wafer to provide for the formation of electrical circuitry in a particular pattern on the semiconductor wafer. The other ten percent (10%) of the light is reflected by the mirror 14 for further amplification in the discharge chamber 18. In this way, a pulse of light is passed in a plurality of successive cycles through the optical system shown in FIG. 1 and described above and is amplified in such successive cycles. Light produced by the optical system shown in FIG. 1 may have a suitable wavelength such as approximately two hundred and forty eight nanometers (248 nm) and a particular bandwidth such as approximately three picometers (3pm).

Figure 2:
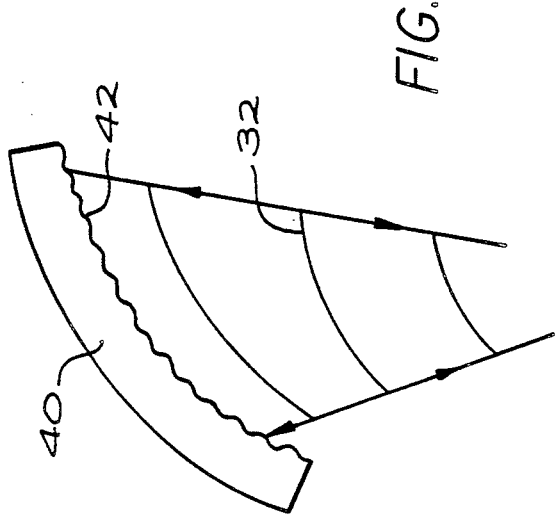
FIG. 2 is an enlarged fragmentary schematic diagram of a grating used in the optical system of the prior art and of wavefronts of light passing to the grating in such optical system of the prior art.

As shown in FIG. 2, the light passing from the mirror 24 to the grating 26 has a curved wavefront indicated at 32 in FIG. 2. This wavefront is defined by the simultaneous positioning of the different light rays in the light beam at any selected instant of time. The curvature in the wavefront 32 results from a number of factors. For example, the diffraction of light impinging on the walls of the apertures 16 and 20 contributes to the curvature in the wavefront 32. Deviations in the surfaces of the mirrors 14 and 24 from a planar configuration also contribute to the curvature in the wavefront 32. Also, curvature of the wavefront can be introduced by the beam expander 22.

As will be appreciated, the curvature in the wavefront 32 is not desirable, particularly since the grating 26 generally has a planar configuration. This causes different rays of light in each individual wavefront 32 to reach the associated steps 28 on the grating 28 at different angles. Because of this, in order to minimize the bandwidth of wavelengths which are allowed to oscillate, the curvature of the grating must be matched as closely as possible to the wavefront 32.

Ideally, light incident upon the grating 26 should be perfectly collimated to obtain a maximum selectivity (or a minimum bandwidth of light). As will be seen from the previous discussion, this is generally difficult to obtain due to practical limitations in optical fabrication. This is particularly true since the light passing through the beam expander 22 is intentionally expanded in width to make certain that the light in the beam will impinge on at least a particular number of the steps 28 in the grating 26. Light has to impinge on at least the particular number of the steps 28 in the grating 26 in order to obtain a meaningful narrowing, to the particular passband of wavelengths, of the bandwidth of the light passing from the grating 26 to the beam expander 22.

FIG. 3 illustrates a modified grating 40 which is included in the optical system of this invention. As will be seen, the grating 40 is curved to conform to the curvature in the wavefront 32. This causes the steps 42 in the grating 40 to be parallel to the wavefront 32 at each successive position in the wavefront 32. As a result, the light rays impinge on the steps 42 in a direction substantially the same for all parts of the beam. This causes the grating 40 to compensate for any deficiencies in the characteristics of the other members in the optical system. Because of this, the particular bandwidth of wavelengths is produced without having to painstakingly match the characteristics of the different components of the optical system as in the prior art.

FIGS. 4 and 5 schematically indicate apparatus, generally indicated at 50, for producing the desired curvature in the grating 40. The apparatus 50 includes a mount 52 for supporting the grating 40 at three spaced positions as by balls 54. A nut 56 is attached to the rear side of the grating 40 on a line extending between one of the balls 54 and a position midway between the other two balls. The nut 56 is attached to the grating 40 at a position midway in distance along this line.

A threaded screw 58 extends from the nut 56 through a pressure plate 60. Springs 62 are disposed between the mount 52 and the pressure plate 60. When the screw 58 is rotated, it moves the middle of the grating 40 downwardly against the constraint of the spring 62. The screw 58 is rotated until the curvature of the grating 40 matches the curvature of the wavefront 32.

Other more sophisticated bending mechanisms may be envisioned, for instance, using multiple pressure plates attached at multiple positions to achieve more complete control over the grating shape.

As will be appreciated, the apparatus shown in FIGS. 4 and 5 and described above may be included in a servo system (FIG. 6) which operates to maintain the bandwidth of wavelengths at a particular value even as the optical components in the optical system age. The servo system shown in FIG. 6 includes a bandwidth sensor 70 for sensing the bandwidth of the wavelengths of light passed by the laser 12. A motor 72 responds to variations in such bandwidth to drive the screw 58 in a direction for maintaining the bandwidth at a particular value.

FIG. 7 shows the tension on the grating 40 along the abscissa and the bandwidth of the wavelengths along the ordinate. As will be seen in FIG. 7, different curves of tension versus bandwidth are shown for the optical system as the different components in the optical system age. The servo system shown in FIG. 6 operates to maintain the bandwidth of the wavelengths at a particular value such as that illustrated at 80 in FIG. 7. It will be appreciated that the servo system shown in FIG. 6 and described above can be set to maintain any other desired bandwidth than the bandwidth 80.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for providing light in a particular band of wavelengths,
a laser having properties of producing a beam of monochromatic light,
means included in the laser for amplifying the light produced by the laser and for increasing the width of the laser beam, the amplifying means including a grating having properties of providing for the amplification only of a particular range of wavelengths in the beam, the grating being bent to compensate for any divergence of the beam in the amplifying means, and
means for adjusting the bending of the grating to compensate for any divergence of the beam in the amplifying means.

2. In a combination as set forth in claim 1,
the amplifying means including a discharge chamber and a beam expander.

3. In a combination as set forth in claim 1,
the amplifying means providing for the passage of the monochromatic light beam a number of times through the amplifying means and a withdrawal of a portion of the energy in the light beam in each such passage and an amplification of the remaining portion of the light beam in each such passage.

4. In a combination as set forth in claim 3,
means associated with the grating in a closed loop servo system for bending the grating to compensate for any divergence of the beam in the amplifying means.

5. In combination for providing light in a particular band of wavelengths
a discharge chamber for amplifying a light beam.
a beam expander for expanding the width of the light beam from the discharge chamber,
a reflector for reflecting the light beam from the beam expander and for producing a wavefront of light, and
a grating having steps for receiving the light beam from the reflector and for returning to the reflector only the portion of the beam in a particular range of wavelengths,
the grating being bent to compensate for any divergence of the light beam from a collimated beam during the passage of the light beam through the discharge chamber and the beam expander and the passage of the light beam to and from the reflector,
the bending of the grating being adjustable to dispose the steps in the grating parallel to the wavefront of light from the reflector.

6. In a combination as set forth in claim 5,
the discharge chamber, the beam expander, the grating and the reflector being disposed to provide for the passage of the light beam a plurality of times through the discharge chamber, the beam expander, the grating and the reflector and an amplification of the light beam in each such passage.

7. In a combination as set forth in claim 6,
means associated with the grating for providing a controlled bending of the grating to dispose the steps in the grating parallel to the wavefront of light from the reflector and to compensate for any divergence of the light beam from a collimated beam during the passage of the light beam through the discharge chamber and the beam expander and the passage of the light beam to and from the beam expander.

8. In a combination as set forth in claim 5,
servo means associated with the grating for bending the grating through a controlled angle to maintain the bandwidth of wavelengths in the light from the laser at a particular value and to dispose the steps in the grating parallel to the wavefront of light from the reflector.

9. In combination for providing monochromatic light in a particular band of wavelengths,
means including a discharge chamber and a beam expander disposed for amplifying the intensity of the monochromatic light and for maintaining the width of the light beam at a particular minimum value and for providing the light in a wavefront,
a grating included in the amplifier means for receiving the beam of the particular minimum value from the beam expander and for returning to the beam expander light having wavelengths in only the particular band, the grating being constructed with steps adjustably disposed relative to one another in the grating to be parallel to the wavefront of light form the expander, and
means associated with the grating for adjustably bending the grating into a concave configuration relative to the beam expander to adjust the steps relative to one another for compensating for any divergence in the beam passing from the beam expander to the grating and for disposing the steps parallel to the wavefront of light from the beam expander.

10. In a combination as set forth in claim 9,
the bending means associated with the grating contacting the grating at three spaced points having a triangular configuration and the bending means being operative to bend the grating on a particular line extending between one of the three spaced points and a line midway between the other two spaced points.

11. In a combination as set forth in claim 10,
the bending means including a member disposed at the particular line midway between the first spaced point and a line extending between the other two spaced points, the member being attached to the grating and means being disposed in co-operative relationship with the member for adjusting the position of the grating at the position of the member in a direction substantially perpendicular to the planar disposition of the grating.

12. In a combination as set forth in claim 11,
the bending means further including a pressure plate and springs supported by the pressure plate and constrained by the adjusting means.

13. In combination for providing light in a particular band of wavelengths,
a laser having properties of producing a beam of monochromatic light,
means included in the laser for providing an amplification of the light beam, the light beam being defined by a curved wavefront, and
grating means included in the amplification means and provided with a plurality of steps at progressive positions along the grating and the grating being adjustably shaped to dispose the steps in a direction substantially parallel to the curved wavefront of light.

14. In a combination as set forth in claim 13,
the grating means normally having a planar configuration, and
means associated with the grating means for adjusting the shaping of the grating means to dispose the steps in the stepped configuration in the direction substantially parallel to the curved wavefront of light.

15. In a combination as set forth in claim 14,
the amplification means including a discharge chamber for amplifying the intensity of the laser beam and further including a beam expander for expanding the width of the amplified beam from the discharge chamber, the grating means being disposed relative to the beam expander to receive the expanded beam from the beam expander and to direct to the beam expander the light beam in the particular bandwidth.

16. In a combination as set forth in claim 15,
the amplification means further including a partially silvered mirror for passing the light from the laser to the discharge chamber and for passing a portion of the light from the discharge chamber to the laser and for reflecting the remaining portion of such light to the discharge chamber for further amplification in the amplification means.

17. In combination for providing light in a particular band of wavelengths,
a laser having properties of producing a beam of monochromatic light,
first means for amplifying the beam of coherent light,
second means included in the amplifying means for providing for the amplification only of the light in the particular band of wavelengths, and
third means responsive to variations in the wavelength characteristics of the light being amplified for adjusting the second means to maintain the amplification for the light beam only in the particular band of wavelengths,
the second means including a grating adjustable in curvature relative to the light beam being amplified to provide for the amplification only of the light in the particular band of wavelengths and the third means being operative to adjust the curvature of the second means to provide for the amplification of the light only in the particular band of wavelengths.

18. In a combination as recited in claim 17,
the first means providing a curved wavefront of light and the grating in the second means having steps and the third means being operative to adjust the curvature of the grating to dispose the steps parallel to the wavefront of light from the first means.

19. In a combination as set forth in claim 17,
the first means having characteristics for producing a curved wavefront for the light beam,
the second means being adjustable to provide a stepped reflective surface in which the steps are substantially parallel to the curved wave front.

20. In a combination as set forth in claim 19,
the first means including a beam expander having characteristics of widening the light beam and of decreasing the curvature of the curved wavefront of the light beams and
the second means being adjustable to receive the light beam from the beam expander and to reflect to the beam expander, from the steps in the stepped configuration of the grating, only the light in the particular band of wavelengths.

21. In a combination as set forth in claim 20, a beam expander disposed in the light path to the grating for directing the light to the grating and for receiving the light reflected from the grating, the beam expander having properties of expanding the width of the light beam and of decreasing any divergence of the light beam,
the grating being adjustable to reflect light from the steps to the beam expander only in the particular band of frequencies.

22. In a combination as set forth in claim 21,
the light beam from the beam expander having a curved wavefront and the grating being adjustable in curvature to dispose the steps in the stepped configuration substantially parallel to the wavefront of the light beam passing to the grating.

23. In combination for providing light in a particular band of wavelengths,
a grating having a plurality of reflective steps in a stepped configuration, the grating being adjustable in curvature to reflect light from the steps only in a particular band of wavelengths, and
means associated with the grating for adjusting the curvature of the grating to obtain a reflection of light by the steps in the grating only in the particular band of wavelengths.

24. In a combination as set forth in claim 23,
means responsive to changes in the bandwidth of the light passing to the grating for adjusting the curvature of the grating to maintain the reflection of the particular band of wavelengths from the steps in the grating.

25. In combination for passing monochromatic light in a particular band of wavelengths,
a first mirror having characteristics of passing the monochromatic light in a first direction and of partially passing the light in a second direction and of partially reflecting the light in the second direction,
a discharge chamber disposed to receive the light passing through the first mirror and constructed to amplify such light,
a beam expander disposed to receive the light passing through the discharge chamber and to pass light to the discharge chamber, the beam expander having characteristics of expanding the width of the beam and of minimizing any divergence of the beam,
a second mirror disposed, and provided with characteristics, to reflect the light from the beam expander and to reflect light to the beam expander, the light reflected from the second mirror having a curved wavefront, and
a grating disposed relative to the second mirror to receive the light received by the second mirror from the beam expander and reflected by the second mirror and to reflect light to the second mirror, the grating being provided with characteristics to reflect to the second mirror only the light in a particular band of wavelengths,
the grating being provided with steps and with an adjustable curvature to disposed the steps parallel to the curved wavefront of light from the second mirror and to compensate for any divergence of the light passing to the grating form the second mirror.

26. In a combination as set forth in claim 25,
means disposed in co-operative relationship with the grating for providing an adjustment in the curvature of the grating to dispose the steps parallel to the curved wavefront of light from the second mirror and to obtain a reflection by the grating to the second mirror only of the light in the particular band of wavelengths.

27. In a combination as set forth in claim 26,
a first aperture disposed relative to the first mirror for limiting the width of the light beam passing between the discharge chamber and the first mirror, and
a second aperture disposed between the discharge chamber and the beam expander for limiting the width of the light beam passing between the discharge chamber and the beam expander.

28. In a combination as set forth in claim 27,
the relative disposition of the first and second mirrors, the discharge chamber, the first and second apertures and the beam expander causing a divergence to occur in the light beam passing to the grating,
the first and second aperture having walls which produce a divergence in the light beam passing to the grating,
the divergence in the light beam passing to the grating producing the curved wavefront of light,
the grating being adjustable in curvature, and the steps being disposed in a stepped configuration, to dispose the steps parallel to the curved wavefront of light in accordance with adjustments in the curvature of the grating.

29. In a combination as set forth in claim 28,
means responsive to the light passing from the grating to the second mirror for adjusting the curvature of the grating to maintain the particular band of wavelengths in such light and to dispose the steps parallel to the curve wavefront of light.

* * * * *